US005340662A

United States Patent [19]

McCarter

[11] Patent Number: 5,340,662

[45] Date of Patent: Aug. 23, 1994

[54] EMERGENCY BATTERY SYSTEM WITH AN INFINITE SHELF LIFE

[75] Inventor: Walter K. McCarter, Davie, Fla.

[73] Assignee: ACR Electronics, Inc., Fort Lauderdale, Fla.

[21] Appl. No.: 5,228

[22] Filed: Jan. 15, 1993

[51] Int. Cl.⁵ .......................... H01M 6/30; H01M 6/32
[52] U.S. Cl. ........................................ 429/9; 429/101; 429/223
[58] Field of Search ............... 429/9, 101, 223

[56] References Cited

U.S. PATENT DOCUMENTS 3,200,014 2/1962 Roberts .................................. 429/9
4,605,604 8/1986 Pollack et al. ................... 429/223 X

FOREIGN PATENT DOCUMENTS 2173056 10/1986 United Kingdom .

Primary Examiner—David B. Springer
Attorney, Agent, or Firm—Malin, Haley, DiMaggio & Crosby

[57] ABSTRACT

An emergency battery system having an infinite shelf life, comprising a first primary reserve, water-activated battery that can be connected directly to an emergency appliance to provide voltage therein once activated, that can be connected to a self-contained, rechargeable battery utilized with the water-activated battery and stored for long periods of time to provide charge to the rechargeable battery, which itself can then be connected to an electrical emergency appliance, or the water-activated battery is connected to a power conversion circuit that can provide a variety of voltages to emergency electrical appliances that already have their own self-contained, rechargeable batteries. The emergency battery system described herein can be used to power emergency appliances, such as lights, lanterns, emergency radios, or DC-powered telephones. As long as the water-activated battery is kept free of moisture or water, the shelf life is virtually infinite.

13 Claims, 3 Drawing Sheets

EMERGENCY BATTERY SYSTEM WITH AN INFINITE SHELF LIFE

BACKGROUND OF THE INVENTION

1. Field of the Invention

This invention relates to an emergency battery system, preferably portable, designed for an extremely long shelf life, that can ultimately be used in an emergency to provide direct current electrical power to one or more small electrical devices such as a flashlight, signal light, cellular phone, portable radio, or other emergency system requiring electricity, and in particular, to a battery system that is reliable after remaining unused for years, primarily for specific use in an emergency.

2. Description of the Prior Art

Three different types of portable, small battery systems are well known for use in emergency situations.

Standard conventional dry cell batteries of various sizes from AAA to C and D-size batteries are conventionally used in flashlights, emergency lights, and even cellular phones. Such conventional dry cell batteries lose their charge through self-discharge over a period of time and are inoperable after a predetermined amount of years on the shelf, even without ever actually having been used.

Rechargeable batteries, such as nickel cadmium batteries have been used extensively in recent years. One primary difference between a dry cell battery and a rechargeable battery is that the rechargeable battery can be periodically recharged so that the battery remains ready for operation, notwithstanding self-discharge of the battery over a period of time. In fact, rechargeable batteries self-discharge faster than typical dry cell batteries. Therefore, if they are not recharged often, a rechargeable battery that sits on the shelf for years will, in fact, have no charge and will not be operable.

Thirdly, a primary reserve, water-activated battery has been used for small survival lights or emergency radios. Typically, the primary reserve, water-activated battery is a high impedance battery which is used to power a small signal light or the like. The primary reserve, water-activated batter has an extremely long, extended shelf life, provided that no water is received into the battery. Once water or moisture is added to the water-activated battery, then the battery is in an activated state and will continue until it is completely discharged.

One primary drawback of both a dry cell battery and a rechargeable battery is their relatively short shelf life. Typically, after years of non-use, at the moment of need, during an extreme emergency situation, the dry cell battery, or the rechargeable battery, has no charge. This obviously results in emergency equipment not being operable at the critical moment of time. Therefore, the use of dry cell batteries for emergency equipment requires constant vigilance in monitoring the state of charge of the dry cell periodically and requiring changing of batteries to insure future reliability, a costly undertaking. Thus, the expense is not only the time required to monitor, but also the use of numerous batteries over a long period of time which have to be changed. Obviously, with rechargeable batteries, the problem of monitoring and recharging the batteries is again costly, time consuming, and requiring vigilance over a long period of time to insure that an emergency system will be usable at the critical moment.

The present invention overcomes the problems in the prior art by providing a relatively inexpensive battery system that does not require monitoring, that does not require constant changing of batteries, and that can be depended upon to provide emergency electrical power at the moment of need no matter how many years the system has remained on the shelf. The system, in accordance with the invention, employs a primary reserve, water-activated battery that may be used 1) together with its own rechargeable battery that can power an emergency appliance, 2) to charge an appliance having its own self-contained rechargeable battery, or 3) be configured to provide specific voltage directly to a particular appliance, such as, for example, a 25 watt radio with 4 to 5 amps of required power.

SUMMARY OF THE INVENTION

An emergency primary reserve battery system having an extremely long, extended shelf life (many years), comprising a primary reserve, water-activated battery, mounted in a first waterproof housing, said first housing having an access hole for adding salt water, contaminated water, or fresh water to effect activation of the water-activated battery mounted within the first housing, said water-activated battery and housing including electrical connectors that provide for utilization of the invention in three specific different configurations and modes of operation.

In a first embodiment of the invention, the water-activated battery mounted in the first housing includes an electrical connector, such as a female plug, that can receive a receptacle that is utilized on various small electrical appliances that plug into, for example, a 12-volt battery system used in an automobile or other type vehicle that has a cigarette lighter. This will allow the water-activated battery to be directly plugged into an appliance that can receive electrical current from the water-activated battery after water has been introduced into the first housing.

In a second configuration and mode of operation, the water-activated battery mounted in the first housing is electrically connected to a second battery that itself is rechargeable. The rechargeable battery plates can be constructed of nickel metal hydrides, which have an extended shelf life, or conventional nickel cadmium, or lead acid. In any event, the voltages of the batteries are predetermined, such that in the combination, the water-activated battery mounted in the first housing will have sufficient power and includes a plurality of small, water-activated batteries mounted in series that connect to conductors that attach directly to the input recharge lines in the rechargeable battery, which has its own housing. The rechargeable battery also has output connectors which include a female plug to receive a male plug that is utilized on an appliance to plug into a cigarette lighter typically found in a vehicle in a 12-volt or 6-volt system. Thus, the output of the rechargeable battery is connected to supply power to a small DC appliance. In operation, when water is added to the first housing, causing the water-activated battery to be charged, the rechargeable battery will itself be recharged partially or fully, and once partially charged, is ready to be used with small appliances, such as lamp lights, small radios, or telephones that are DC operated. In this configuration, the high impedance, water-activated battery thus provides a charge to the typically low impedance, rechargeable battery which is then quite useful in operating appliances, such as small flashlights, electric lights, or other typical emergency appliances.

In the third embodiment of the invention, and the third configuration, the water-activated battery in the first housing will have a predetermined number of small, water-activated batteries to achieve a particular voltage. Attached to the first housing, which has access holes to add water, is a DC to DC power converter that takes the voltage of the water-activated battery and provides, through a DC power converter circuitry, which itself is conventional, a variety of output voltages between 3 volts and 15 volts with discreet values obtainable therebetween. The output is then used to provide a recharge voltage to an appliance that already has its own self-contained rechargeable battery system, which is quite conventional and typical for flashlights, lanterns, cellular telephones, and even some small radios. Typically, each of these small emergency appliances has a male electrical plug that fits into a cigarette lighter used in a vehicle. Therefore, the power converter circuitry output in this mode would include a female plug that can receive the male plug of an appliance that has its own rechargeable battery and, through the use of the power converter, a switch mode is provided to have discreet output voltage, as required by the particular appliance selected. Thus, in operation, once the water-activated battery has been charged by adding water to the first housing, a switch is activated and moved to determine the voltage output desired. A typical appliance, such as a lantern with a rechargeable battery that may require 6 volts, is then plugged into the female plug that is the output of the power converter. Thus, the charge in the water-activated battery will also partially or fully charge the rechargeable battery that is permanently attached to the emergency appliance, thus providing power to the device. The power converter works as a constant wattage system and includes a transformer to step up the voltage as required and as selected by the selector switch.

In summary, therefore, the battery system provided by the invention has basically an infinite shelf life as long as the primary reserve, water-activated battery remains dry. In any one of the three configurations discussed, the battery will be ready to provide charge, either directly to an appliance, to a self-contained, rechargeable battery that itself is used to power a typical small, emergency appliance, or through a power converter circuit which can be used to recharge a rechargeable battery system that is permanently part of the appliance itself. As can be seen from any one of these configurations, the primary determinant of the shelf life obviously is the water-activated battery. Secondarily, the use particularly of nickel metal hydrides as a rechargeable battery has an extremely long shelf life. Using the present invention, a reliable, dependable, very economical power supply system can be provided for emergency situations that can extend over years without monitoring or replacing batteries.

In order to enhance the electrolytic solution of the water-activated battery, a packet of sodium chloride (salt) can be included in a tea bag-like, porous package in the base of the waterproof housing that holds the water-activated battery. Thus, even if fresh water is added, there will be plenty of ions provided in such a solution when the sodium chloride goes into solution in the fresh water.

The battery system described herein, in any one of its configurations, provides for an easily stored, portable, extremely reliable DC power source for small, emergency electrical appliances with an extremely high reliability factor.

It is an object of this invention to provide an improved emergency battery system for powering small, emergency appliances, the battery system having an extensively long, indefinite shelf life with extreme reliability.

It is another object of this invention to provide an emergency battery system that includes a water-activated, primary reserve battery that can be used after an extended shelf life with extreme reliability.

And yet another object of this invention is to provide a battery system for emergencies with an extended shelf life that includes the use of a water-activated, primary reserve battery in one configuration in conjunction with a self-contained, rechargeable battery that itself can be charged and used with small, DC emergency appliances, such as emergency lights, telephones, and radios.

And yet another object of this invention is to provide an emergency battery system that may be portable and includes a water-activated battery, having an extremely long shelf life in conjunction with a power conversion circuit that can be utilized to recharge an appliance that itself has a self-contained, rechargeable battery for emergency situations.

But yet still another object of this invention is to provide a water-activated, primary reserve battery system that can be used in an emergency to provide direct power to an emergency appliance.

In accordance with these and other objects which will be apparent hereinafter, the instant invention will now become described with particular reference to the accompanying drawings.

DESCRIPTION OF THE PREFERRED EMBODIMENTS

Figure 1:
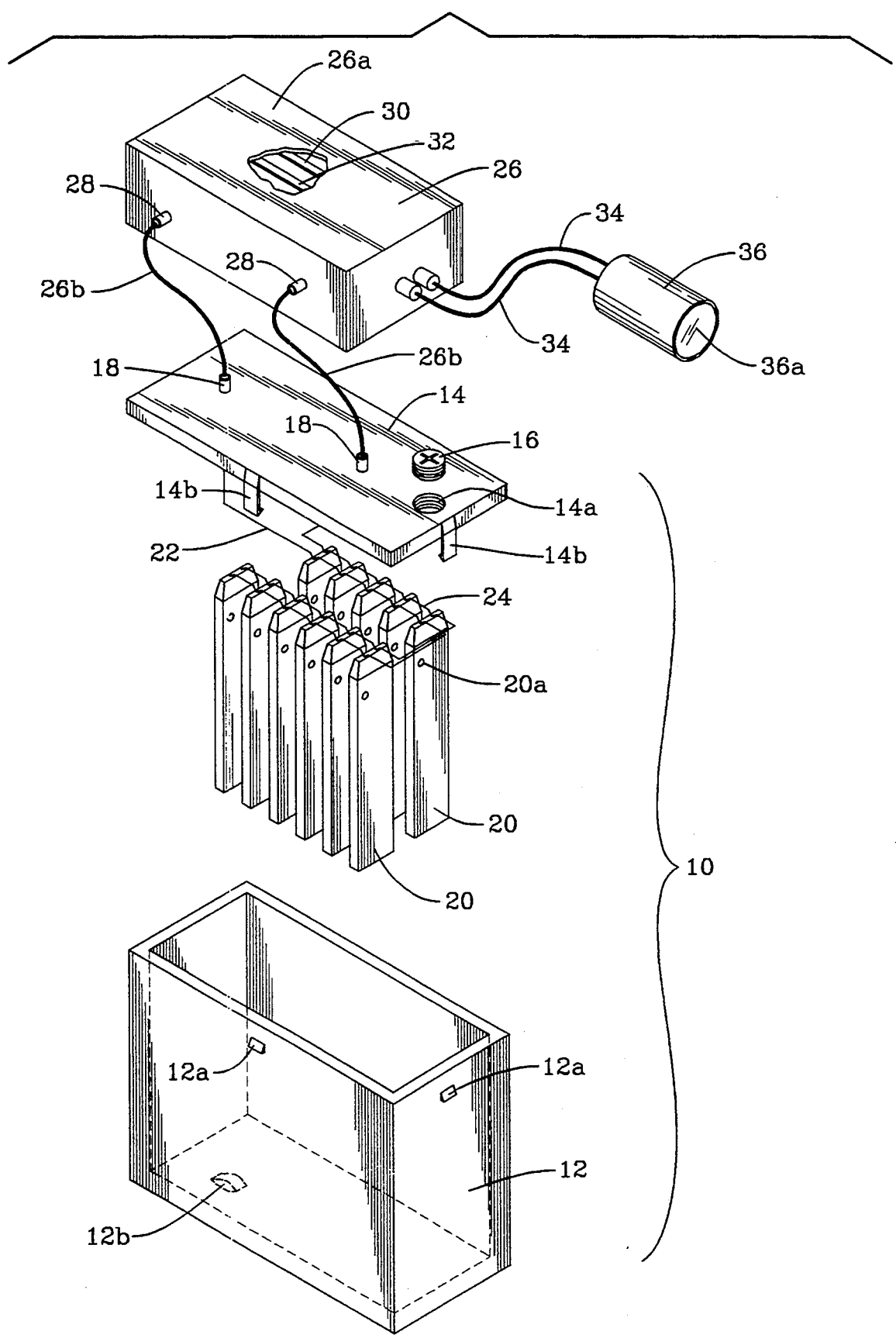
FIG. 1 shows a perspective view, partially cut away, of one mode and embodiment of the present invention.
Figure 2:
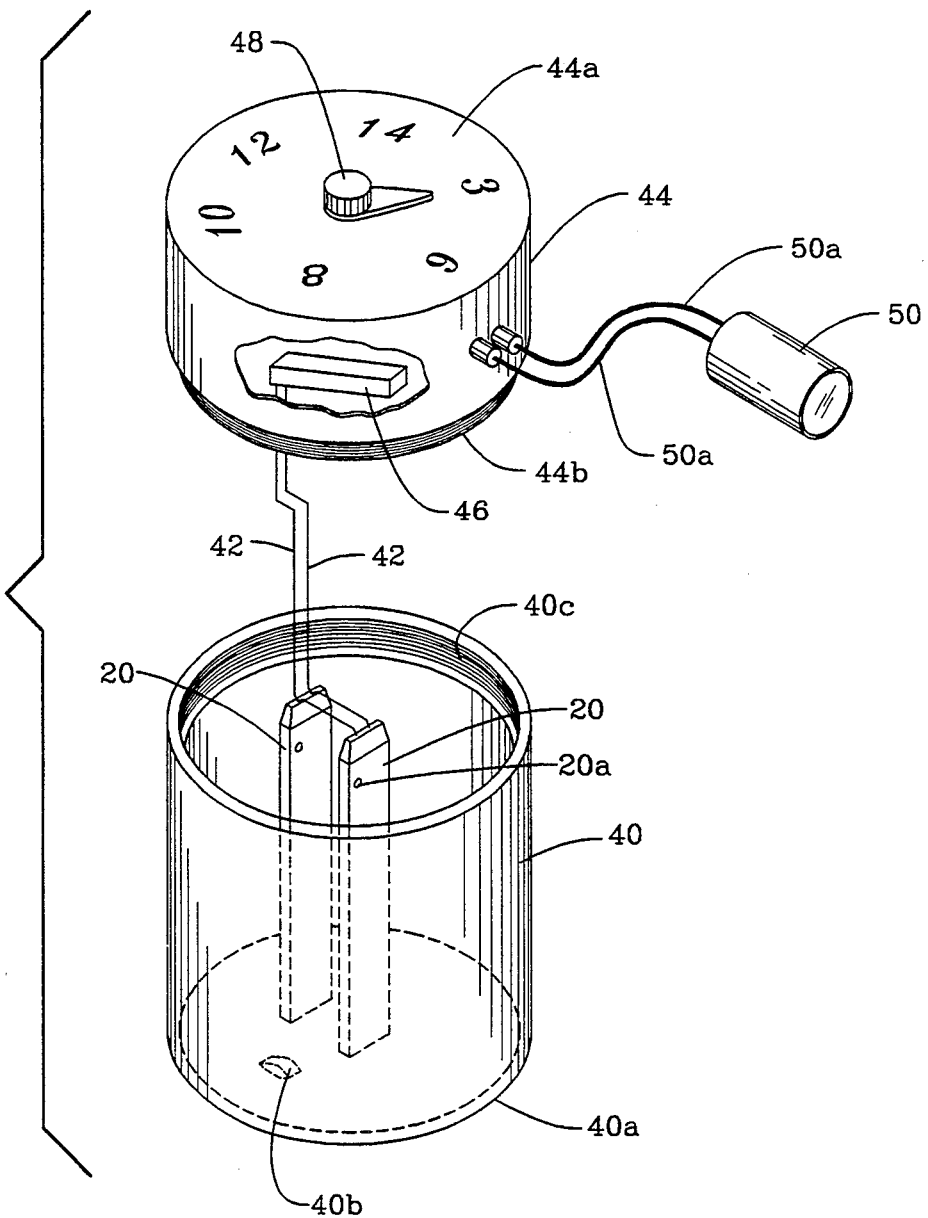
FIG. 2 shows a perspective view of an alternate embodiment of the invention, partially cut away.
Figure 3:
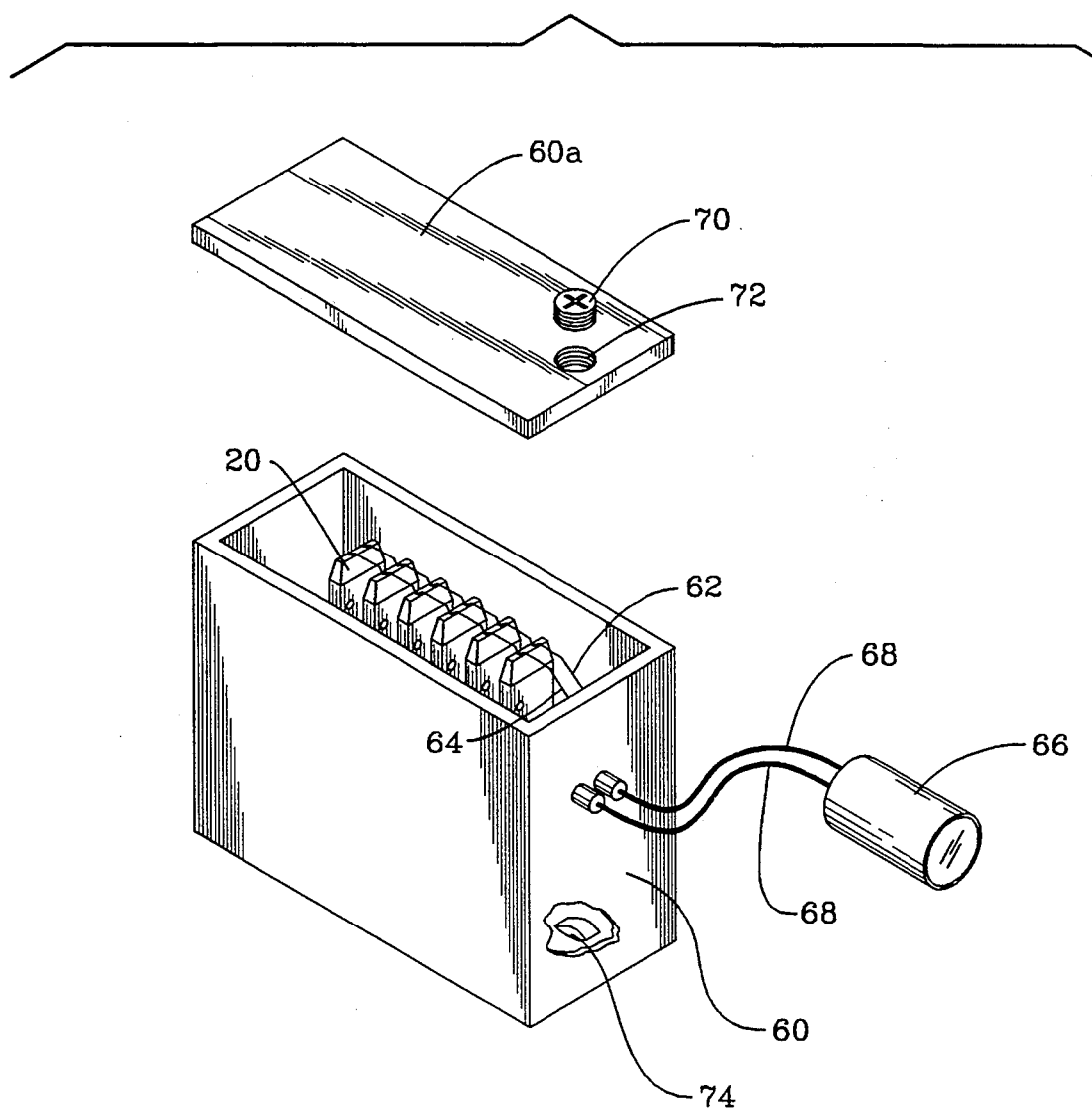
FIG. 3 shows yet another alternate embodiment of the invention in a perspective view, partially cut away.

Referring now to the drawings, FIG. 1 shows one mode of operation and configuration of the invention, FIG. 2 shows a different embodiment, configuration, and mode of operation of the invention, and FIG. 3 shows yet another alternate embodiment of the invention.

Referring now to FIG. 1, one configuration, and embodiment of the invention, is comprised of a water-activated, primary reserve battery 10, which is electrically connected to a rechargeable battery 26, which has an output source or receptacle 36 that can be attached to a specific emergency appliance, such as a 12-volt marine radio.

The water-activated battery 10 includes a plurality of individual water-activated batteries 20, each housing of which includes an aperture 20a and another aperture (not shown) that is used to admit water into the interior chamber of the battery, which contains a plurality of magnesium plates opposed to cuprous iodide plates or silver chloride, preferably separated by 0.040 inches, all of which are electrically connected together in series.

The number of individual water-activated batteries 20 will determine, obviously, the total voltage of the system desired for charging purposes. The individual water-activated batteries 20 are mounted in a waterproof (preferably plastic) first housing 12 that is enclosed by a sealed cover 14 and attached to projections 12a by resilient clips 14b on cover 14. The operating of battery 20 is described in detail in Applicant's U.S. patent application Ser. No. 07/972,976 entitled Improved Rescue Light, filed Nov. 6, 1992, the disclosure of which is incorporated herein. A seal between the cover and the first housing 12 may be provided and is not shown. The cover 14 includes a pair of electrodes 18 projecting therethrough that are electrically connected to conductive wires 22 and 24, which connect all of the batteries 20 in series. Also connected to the electrodes 18 are a pair of conductors 26b, which are attached to a rechargeable battery 26, having nickel plates 30 and metal hydride plates 32 mounted within a sealed housing 26a, the interior plates of which are connected to input electrodes 28. The rechargeable battery 26 also includes an output receptacle 36 that is a female receptacle having a female opening 36a that can receive, and is sized to be used with, a conventional cigarette lighter electrical plug-in device that is commonly found on numerous types of DC-powered electrical appliances especially for emergency use, such as lanterns, lights, radios, and cellular or cellular-type telephones that are DC-powered.

The primary reserve, water-activated battery mounted in housing 12 also includes an aperture 14a in the cover 14 that receives a removable threaded plug 16 that threadably fits within aperture 14a. The aperture 14a is used to access the inside of housing 12 when necessary to add water to the inside of housing 12. Housing 12 may also contain a small package of sodium chloride 12b that is in a porous or porous-like container, such as a flow-through tea bag, to allow water to flow in and contact the sodium chloride for solution to improve the electrolytic action of any water that is added to housing 12 to activate the individual water-activated batteries 20. Thus, the system can be used reliably with fresh water, along with either salt water or polluted water that contains contaminants.

In operation, once water has been added into first housing 12 through aperture 14a, and the water-activated batteries 20 are charged or partially charged, the rechargeable battery 26 receives a partial or full charge, depending on the time that the system is utilized. Once the rechargeable battery 26 is at least partially charged, then the female receptacle 36 can be used to receive a plug from an appliance to be powered that includes a standard cigarette lighter type of electrical plug-in. The system could also include outputs of conventional wire leads or connectors, if desired.

Referring now to FIG. 2, an alternate embodiment of the invention is shown. A waterproof, cylindrical housing 40 includes a pair of water-activated batteries 20, connected in series by conductors 42, which attach into an upper housing 44, which contains a power converter circuit 46 connected to conductors 42, and also connected to an output female receptacle 50 that also acts to be used with a male electrical plug-in, used typically with a cigarette lighter for providing DC power to a small appliance, such as an emergency device. The power converter circuit 46 is connected to an actuating switch 48 that can manually be turned relative to the indicia mounted on top surface 44a that shows the numerals "3," "6", "9," "12," and "15." Each of these numerals refers to various voltages of discreet amount that can be selected by manual actuation of the knob 48. The power converter circuitry 46 includes a step-up transformer and other conventional circuitry that allows the voltage of the water-activated battery mounted in housing 40 to be changed so that the output 50 receptacle will provide the particular voltage as set by the device. Note that in this configuration, the water-activated battery is connected not to a rechargeable battery, but to the power converter circuitry and to the output receptacle 50. The utilization of the device shown herein in FIG. 2 is specifically for use with an emergency appliance that has already a self-contained, rechargeable battery commonly found in lanterns, telephones, flashlights, and other types of devices, even radios, but may also be used to supply power directly to low voltage appliances. Therefore, a rechargeable, self-contained battery is not necessary in the configuration of FIG. 2. The proper amount of voltage which can be selected is provided through receptacle 50, which is plugged into, by a male plug, a specific appliance so that a partial charge or full charge can be provided to the rechargeable battery already mounted in the appliance itself. Note that the shelf life of the water-activated batteries 20 is infinite as long as batteries 20 are kept dry. The batteries 20 are mounted within waterproof housing 40, which threadably attaches by threads 40c to the power converter housing 44, which has its own threads 44b to make the housing 40 waterproof. Again, in the bottom of housing 40, which has a sealed bottom 40a, the package of sodium chloride 40b, allowing flow-through into solution is also provided.

Referring now to FIG. 3, wherein yet another alternate embodiment is provided which utilizes a waterproof housing 60 that contains a plurality of individual water-activated batteries 20, wired together in series by conductors 62 and 64 and which have a direct electrical connection to a receptacle 66 through conductor 68, mounted through housing 60, which itself is waterproof and preferably plastic. The top cover 60a of housing 60 ia sealably connected to housing 60, may be made removable and includes an aperture 72 with a threaded plug 70 that allows aperture 72 that has threads to be sealed until it is time to add water through aperture 72, which powers the individual water-activated batteries 20, providing output power to female receptacle 66, which again can receive a male plug that is a conventional plug-in for a cigarette lighter in a typical vehicle. In this embodiment, the device can be used to power an appliance directly through receptacle 66 if the appliance has a typical cigarette lighter plug-in, and is especially useful for small appliances that could be activated directly by the particular predetermined amount of voltage put out by the water-activated primary reserve battery as shown. Thus, this embodiment would be tailored to be useful with a particular device having a known voltage requirement that can be used directly without the interposition of a rechargeable battery.

As can be seen in all three modes and configurations of the invention, the primary operating component is the primary reserve battery, water-activated, that has, in effect, an infinite shelf life. When used in conjunction with a rechargeable battery that is self-contained with the emergency power system provided, especially if a nickel metal hydride rechargeable battery is used, the overall system, including the rechargeable battery, has, in effect, an infinite shelf life.

Of particular importance in the scale of economy using the present system, it can be readily seen that no monitoring whatsoever is required of the system, provided that the water-activated battery remain dry until time of use. Water activated batteries do not have to be replaced periodically. The rechargeable batteries utilized herein do not have to be recharged periodically. And yet the reliability of the system is in no way compromised by failure to monitor the system over many, many years, where it will be waiting and ready for that emergency situation requiring DC electrical power.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An emergency battery system having a substantially indefinite shelf life comprising:
   a water-activated battery;
   a rechargeable battery; and
   means for connecting said water-activated battery to said rechargeable battery, said rechargeable battery having power output electrodes for attachment to an emergency appliance, wherein when said water-activated battery is activated by adding water, said rechargeable battery is charged by said water-activated battery.

2. A battery system as in claim 1, wherein said water-activated battery is of high impedance and said rechargeable battery is low impedance.

3. A battery system as in claim 1, wherein said rechargeable battery includes nickel and metal hydride plates.

4. A battery system as in claim 1, wherein said rechargeable battery includes nickel cadmium plates.

5. A battery system as in claim 1, including a first sealable housing sized to receive said water-activated battery.

6. A battery system as in claim 5, including:
   a water permeable package;
   an electrolyte material in said package, said package mounted in said water-activated battery housing.

7. A battery system as in claim 1 that is portable.

8. An emergency battery system, comprising:
   a first storage housing that is substantially waterproof;
   water-activated battery means mounted in said waterproof storage housing, said storage housing having access means for adding water to said storage housing; and
   electrical conductor means electrically connected to said water-activated battery means, said electrical connector conductor means including an output receptacle whereby once activated with water, said water-activated battery means can be connected electrically to an emergency appliance.

9. An emergency battery as in claim 8, including:
   output electrical connector means for receiving a male plug conventionally used to plug into a cigarette lighter.

10. An emergency battery system as in claim 8, wherein:
    said storage housing includes a flow-through package of a water-soluble electrolyte material for enhancing the electrolytic content of said water added to said storage housing.

11. An emergency battery system having a substantially indefinite shelf life comprising:
    a first storage housing that is waterproof;
    a water-activated battery mounted within said storage housing;
    access means for providing access to said storage housing for providing water to said storage housing;
    DC power converter circuit means connected to the output of said water-activated battery, said water-activated battery including conductor means for attachment to said power converter circuit; and
    output connector means connected to said power converter circuit means for providing output voltage and current to an emergency electrical device.

12. An emergency battery as in claim 11, including:
    manually-actuated circuit means for changing the output voltage of said power converter circuit means to provide a predetermined, specified voltage to said output conductor connector means, whereby the output voltage can be regulated to the emergency appliance.

13. A method of utilizing a water-actuated chemical storage battery for charging rechargeable dry cell batteries in household appliances during electrical power outages, comprising the steps of:
    storing a water-actuated chemical storage battery energy capable of producing electrical current to recharge a rechargeable dry cell battery;
    applying water to chemical stored within said battery to actuate potential energy within said battery;
    connecting said chemical storage battery to rechargeable dry cell battery which has been discharged; and
    charging said rechargeable dry cell battery until charged and capable of supplying power to its associated appliance.

* * * * *